July 7, 1953 J. A. STEDMAN 2,644,240

EASY READING MICROMETER CALIPER

Filed May 5, 1950

INVENTOR.
James A. Stedman
BY Nathaniel Frucht
ATTORNEY

Patented July 7, 1953 2,644,240

UNITED STATES PATENT OFFICE 2,644,240

EASY READING MICROMETER CALIPER

James A. Stedman, Cranston, R. I., assignor to Curtis Company, a corporation of Pennsylvania Application May 5, 1950, Serial No. 160,242

2 Claims. (Cl. 33—166)

The present invention relates to micrometer calipers, and has particular reference to an improved construction for facilitating micrometer readings.

The principal object of the invention is to improve the construction of the micrometer caliper to disclose the reading in figures, whereby the reading is greatly facilitated.

Another object of the invention is to construct a micrometer caliper with indicating disks for indicating thousandths.

A further object of the invention is to provide a novel assembly for rotating the indicating disks as the thimble is turned.

With the above and other objects and advantageous features in view, the invention consists of a novel arrangement of parts, more fully disclosed in the detailed description following, in conjunction with the accompanying drawings, and more specifically defined in the claims appended thereto.

It has been found desirable to provide an improved construction for an easy reading micrometer caliper, which has indicating disks visible through openings in the thimble and movable as the thimble is turned to register thousandths in micrometers of five, whereby the micrometer reading is facilitated. To this end, I have provided a holder for a series of indicating disks which is mounted in the thimble and a disk operating member which is held stationary, whereby rotation of the thimble successively engages the disk with the operating member to display the extent of linear movement of the spindle in thousandths.

Figures 1, 2:
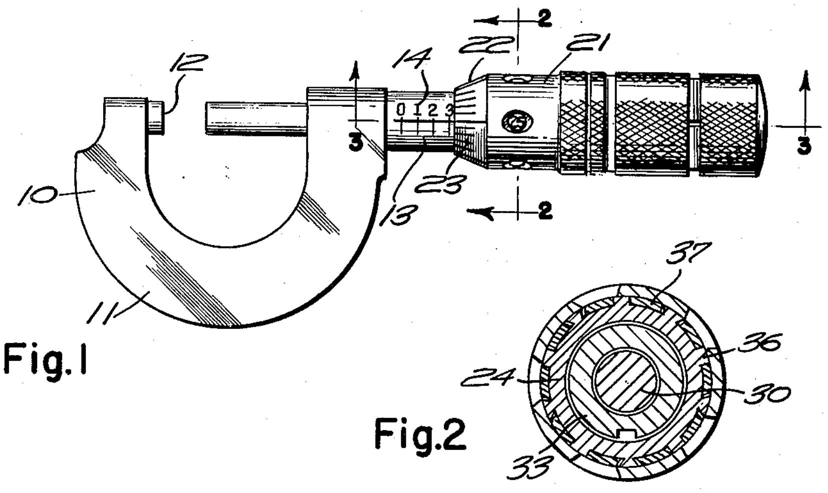
Fig. 1 is a face view of the improved micrometer caliper, showing the reading to be three hundred twenty-five thousandths of an inch.
Fig. 2 is an enlarged sectional detail on the line 2—2 of Fig. 1.

Referring to the drawings, the micrometer caliper 10 includes a U-shaped frame 11 having an anvil 12 facing inwardly at one end of the frame and an outwardly extending internally screw-threaded barrel 13 at the other end of the frame, the barrel being graduated on its surface by transverse lines into tenths of an inch, with indicia 14 having an indicating numeral for each transverse line, as shown in Fig. 1.

The barrel has an outer longitudinal slot 15, and a ring operating member 16 is slidably splined on the barrel and is provided with a radial key 17 which has a sliding fit in the slot 15, and an edge tooth 18 which as indentures 19 at each side thereof and projects from the forward edge 20. A thimble 21 is slidably mounted on the barrel 13, and has its forward end 22 tapered and graduated by long and short lines 23 into twenty-five equal parts. The rear end of the thimble is threaded to receive the threaded rear end of a thimble sleeve 24, a lock nut 25 being mounted on the thimble sleeve threads. An inner cap section 26 is also on the thimble sleeve threads, and has a reduced split rear end 27 which is externally threaded for mounting an internally threaded cap 28 thereon, whereby the split rear end firmly grips the cylindrical upper part 29 of a finely threaded spindle 30. An adjustment screw 31 in the end of the cap 29 permits a setting adjustment of the thimble with respect to the barrel 13, which has its rear end 32 threadedly seated on the spindle, a split threaded extension 33 on the rear end 32 and a clamp ring 34 being provided to take up the slack.

Figure 3:
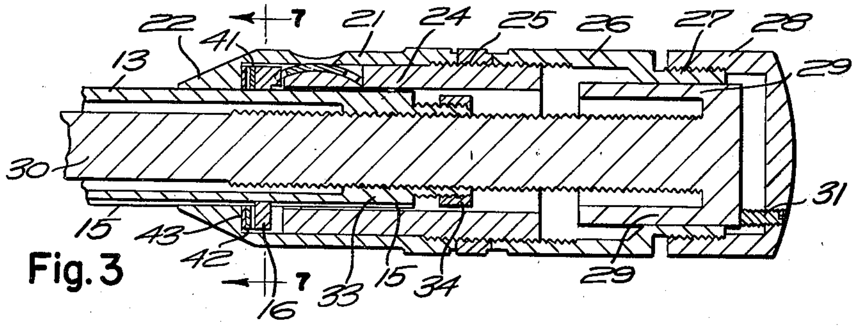
Fig. 3 is an enlarged longitudinal detail on the line 3—3 of Fig. 1.
Figure 4:
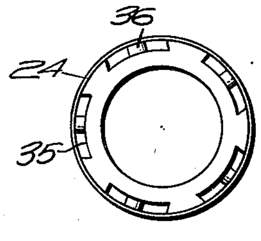
Fig. 4 is an enlarged end view of the disk holding member.
Figure 5:
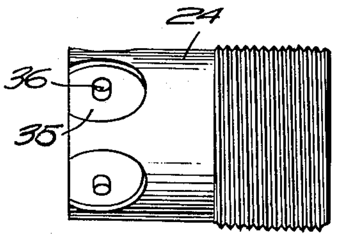
Fig. 5 is an enlarged side view of the disk holding member.
Figure 6:
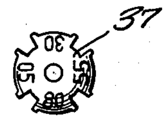
Fig. 6 is an enlarged face view of one disk.
Figure 7:
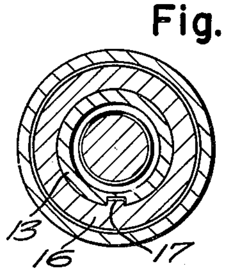
Fig. 7 is a section on the line 7—7 of Fig. 3.
Figure 8:
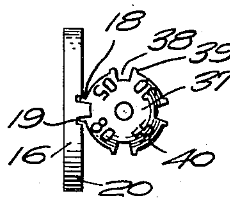
Fig. 8 is an enlarged side view of the disk operating member, showing a disk in its turning position.
Figure 9:
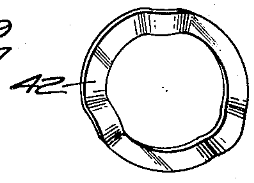
Fig. 9 is a plan view of the annular spring for the disk operating member.

The sleeve 24, see Fig. 3, constitutes a disk holding member, see Fig. 5, five uniformly spaced circular recesses 35 being provided in the forward portion thereof having central pins 36 to receive number disks 37, the faces of the recesses 35 being spherical and the number disks 37 being dished to correspond. The disks 37 each have four notches 38 spaced ninety degrees apart, with projecting lugs 39 at the sides of each notch, and numbers 40 on the disk portions between the notches.

The forward end 22 of the thimble extends internally of the body of the thimble, as shown in Fig. 3, to provide an annular chamber 41 in cooperation with the forward end of the sleeve, in which the ring operating member 16 is housed, together with an annular spring element 42 and a washer 43. The recesses 35, see Fig. 5, are not fully circular, whereby part of the disks 37 project beyond the end of the sleeve 24; rotary movement of the sleeve thus moves the disks, which turn as the lugs 39 and the notches 38 respectively engage the tooth 18 of the ring operating member 16, which cannot rotate due to the sliding key 17. As the disks respectively turn, the members on the disks become visible through openings 44 provided in the wall of the thimble 21.

When the improved micrometer caliper is adjusted to measure a linear dimension of a tool or the like, the thimble is rotated by turning the cap, thus advancing the thimble and its associated parts and the spindle on the barrel. As the timble rotates, the sleeve 24 which carries the disks 37 also rotates, the lugs 39 bearing against the outer edge of the ring operating member 16 until they seat in the indentures 19, whereupon the tooth 18 is received in a notch 38 and the disk 37 turns. A member 40 thus becomes visible through a thimble opening 44, see Fig. 1, to designate the thousandths of an inch of movement, whereby the linear measurement is readily visible. The eye thus sees 0.325 inch in Fig. 1; a slight additional movement to align the next line 23 with the axial line of the indicia 14 would indicate 0.326, etc., until the thimble turns to align the next opening 44 with the indicia 14, whereupon the reading becomes 0.330. The operation is the same whether the thimble is turned to the right or left, the disks turning to disclose the correct readings in the openings 44.

Although I have described a specific constructional embodiment of my invention, it is obvious that changes in the size, shape and arrangement of the parts to meet the requirements for different micrometer caliper needs may be made, without departing from the spirit and the scope of the invention as defined in the appended claims.

I claim:

1. In a micrometer caliper having a spindle, a cylindrical barrel threadedly mounted on the spindle, a rotatable cylindrical thimble slidably positioned on the barrel, said thimble having an annular recess adjacent the barrel, a cylindrical sleeve in said recess spaced from the forward end of the recess to provide an annular chamber, and having a threaded rear portion projecting rearwardly from the thimble, said thimble being internally threaded on its rear end and engaging the sleeve threads, a cap extending over the rear end of the spindle and connected thereto for joint rotation, the forward end of the cap being internally threaded and engaging the sleeve threads, the forward end of the sleeve having five uniformly spaced recesses with spherical seats, number disks of dished shape rotatably seated on said spherical seats and having four notches spaced ninety degrees apart, openings in the barrel permitting seeing of the numbers on the number disks, and a ring member in said annular chamber splined to the barrel for sliding movement thereon, said ring member having a tooth successively engageable with the notches of the number disks as the cap thimble and sleeve are manually rotated.

2. In a micrometer caliper having a spindle, a cylindrical barrel threadedly mounted on the spindle, a rotatable cylindrical thimble slidably positioned on the barrel, said thimble having an annular recess adjacent the barrel, a cylindrical sleeve in said recess spaced from the forward end of the recess to provide an annular chamber, and having a threaded rear portion projecting rearwardly from the thimble, said thimble being internally threaded on its rear end and engaging the sleeve threads, a cap extending over the rear end of the spindle and connected thereto for joint rotation, the forward end of the cap being internally threaded and engaging the sleeve threads, the forward end of the sleeve having five uniformly spaced recesses with spherical seats, number disks of dished shape rotatably seated on said spherical seats and having four notches spaced ninety degrees apart, openings in the barrel permitting seeing of the numbers on the number disks, a ring member in said annular chamber splined to the barrel for sliding movement thereon, said ring member having a tooth successively engageable with the notches of the number disks as the cap, thimble and sleeve are manually rotated, and an annular spring in said annular chamber resiliently urging said ring member towards the sleeve.

JAMES A. STEDMAN.

References Cited in the file of this patent

UNITED STATES PATENTS

| Number | Name | Date |
|---|---|---|
| 990,655 | Jaques | Apr. 25, 1911 |
| 1,021,680 | Jaques | Mar. 26, 1912 |
| 1,121,632 | Jaques | Dec. 22, 1914 |
| 1,350,185 | Show | Aug. 17, 1920 |
| 1,671,553 | Sheldrick | May 29, 1928 |
| 2,129,979 | Westervelt et al. | Sept. 13, 1938 |